Nov. 22, 1960  J. M. HUNT  2,961,607
AUTOMATIC TESTING SYSTEM
Filed July 27, 1956  3 Sheets-Sheet 2

FIG. 2

JOHN M. HUNT
INVENTOR

Darby & Darby
ATTORNEYS

United States Patent Office 2,961,607
Patented Nov. 22, 1960

2,961,607

AUTOMATIC TESTING SYSTEM

John M. Hunt, Palo Alto, Calif., assignor to General Precision, Inc., a corporation of Delaware Filed July 27, 1956, Ser. No. 600,514

10 Claims. (Cl. 324—73)

This invention relates to electrical testing systems and more particularly to an arrangement for automatically testing the accuracy and capabilities of a number of electrical circuits.

With complicated apparatus of the type utilized in computer systems, it is desirable to test each piece of apparatus periodically in order to detect and correct inaccuracies. Routine periodic testing is desirable because of the difficulty of detecting inaccuracies during normal operation and becaues of the necessity of avoiding such inaccuracies. An occasional single fault can cause the validity of any of the system's computations to be in doubt.

In large scale computer systems, such as flight simulator analog computers, fire control systems and navigational computers, the number of circuits to be tested and the number of individual circuit capabilities to be tested are many. It is necessary, therefore, that the routine testing procedure should be rapid, simple and accurate. Conventional testing of computer components, however, generally has been on a manual basis with each association of the testing equipment with a computer component being a separate manual step. Moreover, because analog computers and the like comprise large numbers of interconnected amplifiers, potentiometers, servos, scaling devices, etc., the method of testing the computer has generally been first to adjust the computer to a set of standard conditions and then to check the current and voltage conditions at various terminals throughout the computer for predetermined or expected values. Such a testing method is unsatisfactory because of the many manual adjustments required to set up a standard condition, and also because the expected conditions at the terminals usually all differ. In order to test the many different circuits of a complex computer even under a single "standard" condition with acceptable accuracy, a large number of accurate reference sources are required, which are expensive to provide and which may not be available.

Furthermore, in analog computers which solve differential equations, differentiating circuits provide a zero signal output for steady state input conditions, and integrating circuits provide an output voltage dependent upon the past history of operation, so that the output voltage of a properly operating integrator may be almost any arbitrary value even if the input signal to the integrator is made zero. The operating characteristics of such circuits cannot be tested utilizing the prior art testing method. If non-steady state input conditions are provided, many other circuits will provide time-varying output current and potentials, necessitating the measurement of such voltages at a particular instant of time in order to test the circuits.

It is a general object of this invention to dispense with the necessary labor and manual equipment heretofore required to test a number of multifunctional circuits.

Another object of this invention is to provide automatic apparatus for sequentially checking a number of operating conditions of each of many similar or diverse circuit arrangements.

Still another object of this invention is to provide apparatus for automatically testing the operating characteristics of many different amplifier circuits which are part of an analog computer.

These and other objects are attained in one specific illustrative embodiment of this invention wherein a selector switching means shown as comprising a stepping switch successively connects a large number of amplifier circuits to a detector circuit. The amplifier circuits are tested for an excessive drift condition and thereafter for proper positive and negative output potential conditions. When the testing sequence is initiated, the amplifier circuits and the detector circuit are automatically conditioned by the testing circuit during the first cyclic operation of the stepping switch, for the drift test. During such first cyclic operation the detector circuit checks the output of each of the amplifier circuits in succession. If all the amplifier circuits test acceptable for drift, the amplifier circuits and the detector circuit are automatically conditioned throughout a second cyclic operation of the stepping switch for the positive output test. With the amplifier circuits and detector circuit conditioned in this manner, the stepping switch is reoperated through such second cyclic operation to reconnect the amplifier circuits successively with the detector circuit. Thereafter the sequence is automatically repeated for the negative output test.

A feature of this invention relates to the provision of means for successively conditioning the detector circuit as well as the amplifier circuits in accordance with a number of circuit capability tests. The amplifier circuits may all be different because the conditioning control effectively converts each operational amplifier circuit into a standard amplifier type. The necessity of providing a large number of reference sources against which the different amplifier circuits may be compared is therefore avoided.

Another feature of this invention relates to the means for converting each of the many different amplifier circuits to a standard amplifier circuit. The converting means disconnects the different sized summing resistors, feedback impedances, etc. in the amplifier circuits.

Still another feature of this invention relates to means for disconnecting each of the many different amplifier circuits from their associated components. By disconnecting the amplifier circuits from the rest of the system, they may all readily be tested in the same manner independent of their normal steady-state and non-steady-state operating conditions.

Still another feature of this invention pertains to the provision of apparatus which indicates the nature of the operating condition being checked, the amplifier circuit being tested, and the detection of a failure. When a failure is detected, the test circuit interrupts the testing sequence. Unless the stepping switch is manually advanced, it remains at the indicated amplifier position until the fault is corrected or the amplifier circuit replaced or removed.

When an amplifier circuit is associated with the detector circuit, the impedance conditions presented to each are materially altered. The detector circuit functions as a normal load for the amplifier circuits, and the change in impedance conditions at the detector circuit functions to indicate that an amplifier position is occupied. If the impedance conditions presented to the detector circuit do not change when an amplifier position is tested, the detector circuit passes the position as satisfactory.

The impedance conditions do not change if the amplifier position is blank or vacant.

A further feature of this invention relates to the provision of an automatic testing circuit which will automatically pass an empty amplifier circuit position. Amplifier circuits may be added or removed without requiring modifications in the test circuit and without disturbing the operation of the testing circuit. Analog computers, moreover, are generally constructed on racks which, for standardization purposes are provided with a number of initially unnecessary positions to avoid the possibility of subsequently requiring another amplifier rack. By passing empty amplifier positions as satisfactory, the testing circuit may be permanently associated with the amplifier racks when the computer is constructed independent of which positions are initially empty.

Still another feature of this invention relates to the multifunctional utility of associating the detector circuit with the amplifier circuits. The changes in impedance conditions resulting from an amplifier circuit association allow the detector circuit to check the amplifier circuit, indicate to the detector circuit whether the amplifier position is occupied or blank, and provide a normal load for the amplifier circuit.

Further objects, features and advantages of this invention will become apparent upon consideration of the following description taken in conjunction with the drawings.

It will thus be seen that the objects set forth above, among those made apparent from the preceding description are efficiently attained, and since certain changes may be made in the above construction without departing from the scope of the invention, it is intended that all matter contained in the above description or shown in the accompanying drawing shall be interpreted as illustrative and not in a limiting sense.

For a fuller understanding of the nature and objects of the invention reference should be had to the following detailed description taken in connection with the accompanying drawings, in which.

Figure 1:
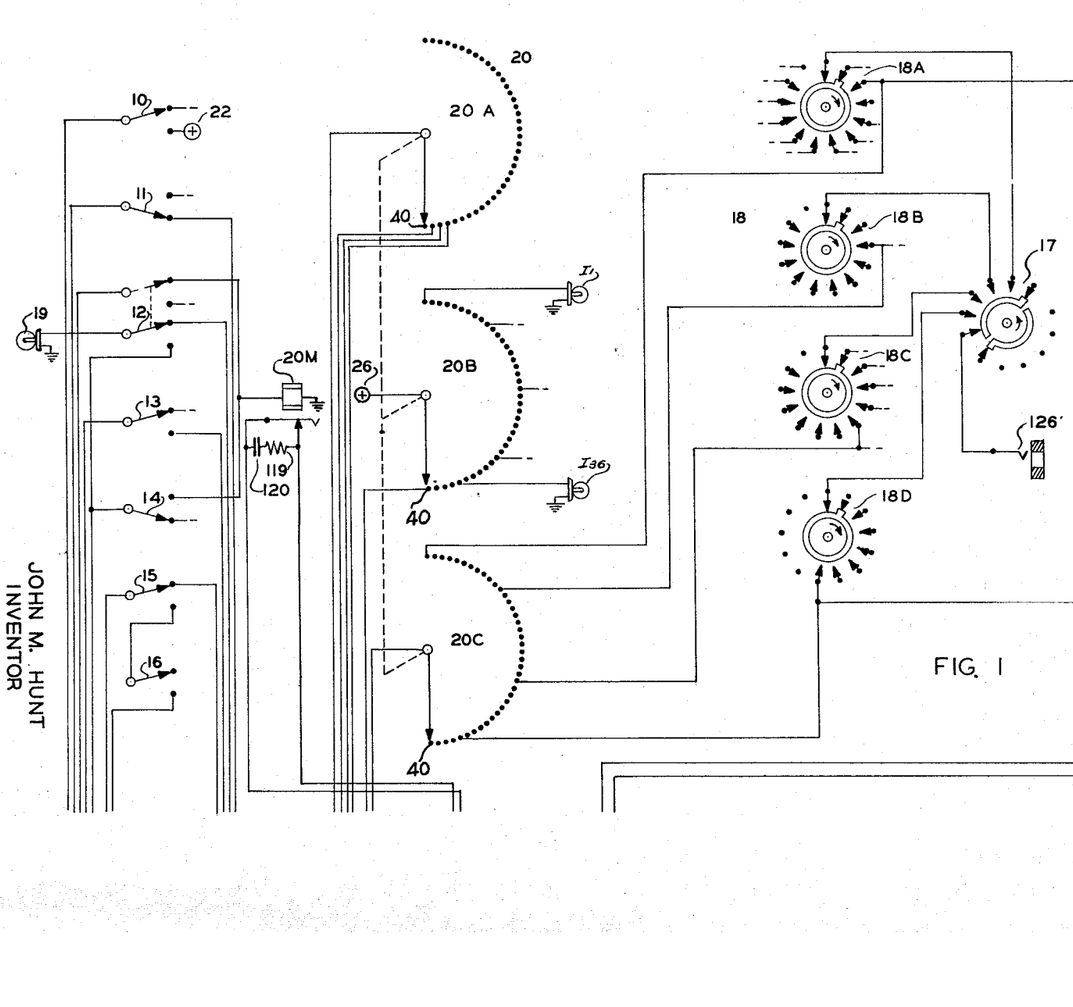
Figs. 1, 2 and 3, when arranged in accordance with Fig. 4, are a circuit representation of the automatic testing system of the present invention.
Figure 2:
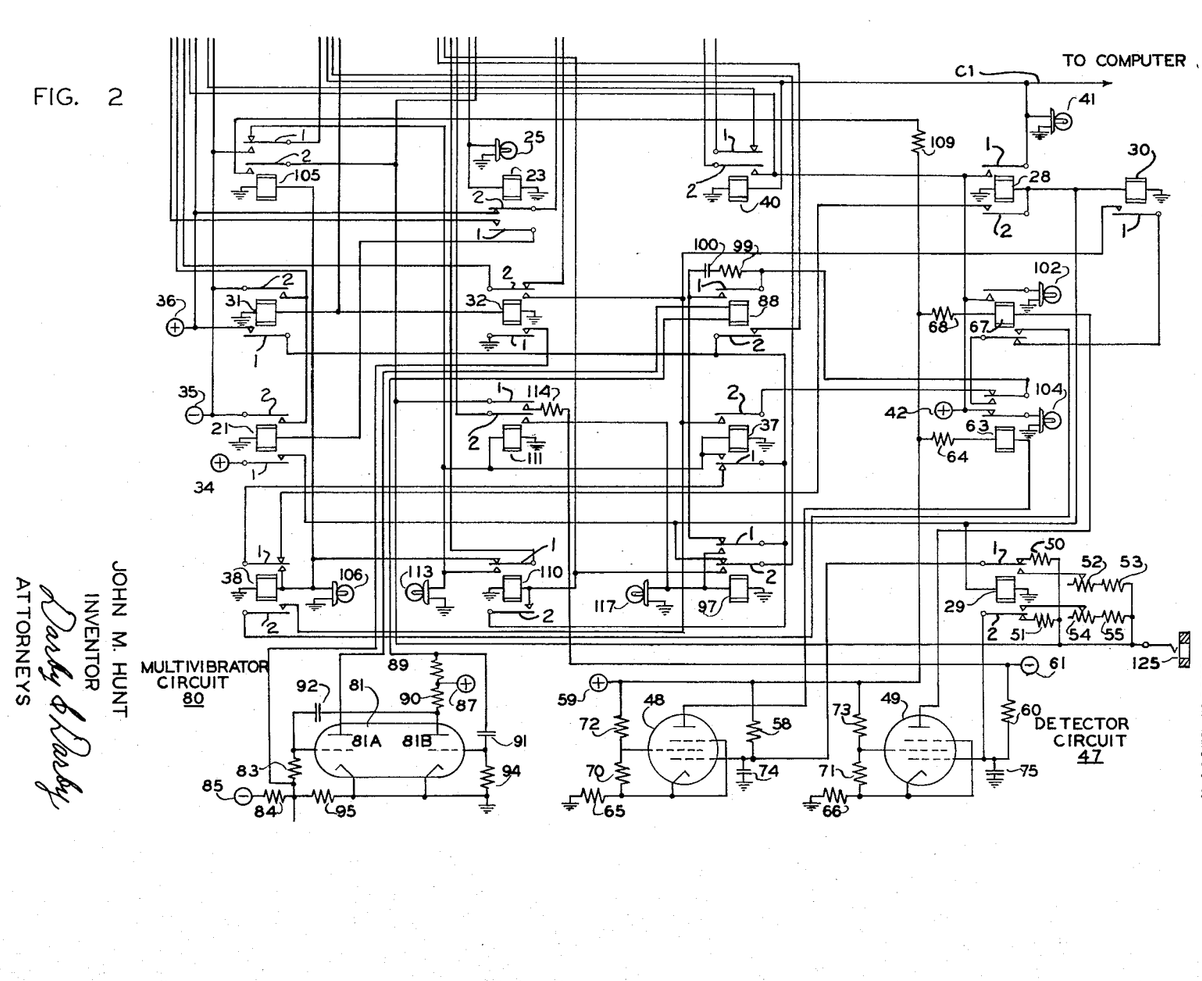
Figures 3, 4:
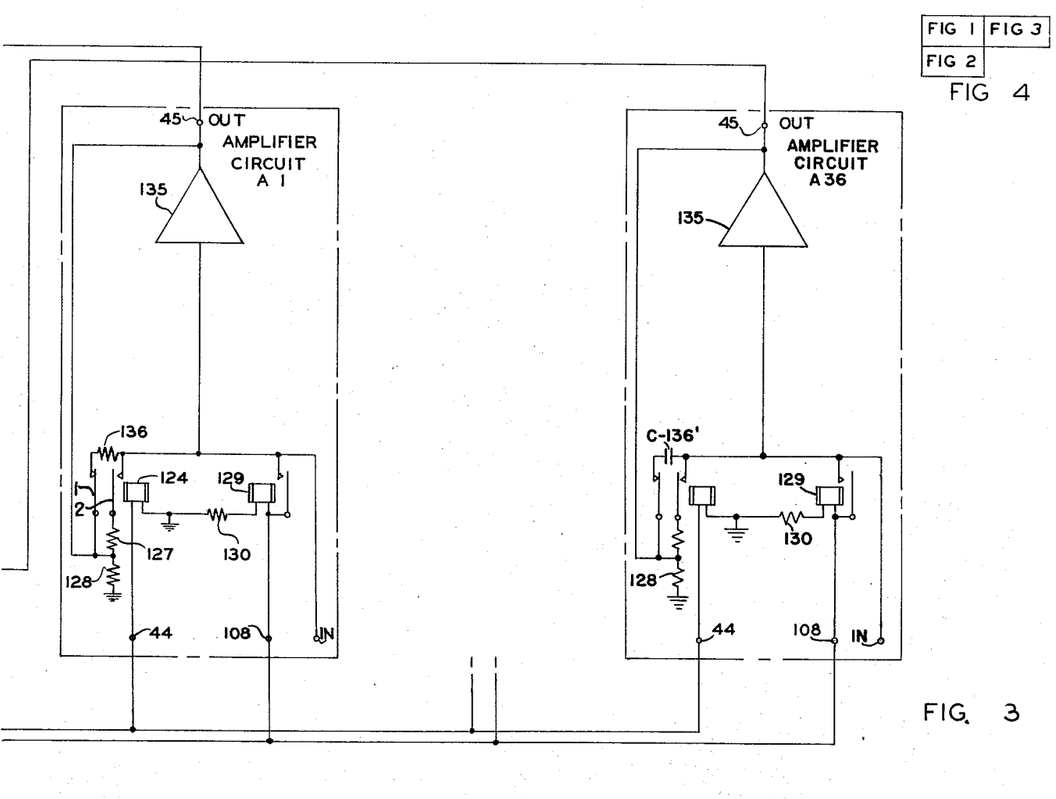
Fig. 4 illustrates the arrangement of Figs. 1, 2 and 3.

The testing circuit, shown in Figs. 1, 2 and 3, when arranged in accordance with Fig. 4, is utilized to test the operating capabilities of 36 amplifier circuits A1-A36 which are shown in Fig. 3. The amplifier circuits A1 through A36 each represents broadly any circuit, network or arrangement which has one or more control or input terminals and a single pair of output terminals. Features of the present invention, therefore, are not restricted to a testing system for amplifier circuits, but are applicable, for example, for testing translator networks, switching systems and components, receiving circuits, etc. In the specific illustrative embodiment, each of the amplifier circuits A1-A36 is tested for excessive unbalance or drift voltage conditions in a flight simulator analog computer which includes the amplifier circuits A1-A36 and also for the capability of the amplifier circuits to supply plus and minus output voltages to a normal load. The testing circuit functions to condition the amplifier circuits A1-A36 in accordance with one of the three tests, and thereafter successively to check the output condition of each of the amplifier circuits A1-A36 for the particular test condition. The testing sequence is automatic through all three tests.

The amplifier circuits A1-A36 may all be different because, as is hereinafter described, the conditioning control for the three tests also effectively converts each of the amplifier circuits A1-A36 into a standard amplifier type. By substituting the same valued impedance into each of the amplifier circuits for the variously valued impedances which may ordinarily be in the circuit, one may provide the same "gain" in all of the amplifiers, so that application of a given input voltage to each of the amplifiers should give the same output voltage from each of the amplifiers, if they are operating properly. Also, a given amount of "drift" at the input circuit of any of the amplifiers will provide a given output voltage, regardless of which amplifier is being tested. By effectively converting the circuits A1-A36 to a standard circuit, complex apparatus and large numbers of reference sources are avoided.

The testing circuit includes a group of manually operated switches 10-18 which provides a complete and flexible control of the testing circuit operation. The function of each of the switches 10-18 and the sequence of operations which follow the actuation of each of the switches 10-18 is hereinafter described in detail.

*Start switch 10*

The start switch 10 is actuated to initate the sequence for testing the amplifier circuits A1-A36 for drift and for positive and negative output capabilities. If the amplifier circuits A1-A36 are satisfactory, the sequence is uninterrupted from the actuation of switch 10 until a satisfactory test completion indication is provided.

When switch 10 is deflected, it causes the operation of the start control relay 21 by completing an operating path from the plus 28-volt potential source 22 through the actuated armature of switch 10, the operated armature 1 of the zero position relay 23 and the winding of relay 21 to ground. The zero position relay 23 is operated whenever a stepping switch 20 is at its zero position.

The switch 20 is a rotary-type selector or stepping switch and has three arcs, banks or sections 20a, 20b and 20c, of 40 terminals each, over which associated wipers pass. The wipers or wiper arms are of the non-bridging type which leave one terminal before contact with the next terminal is made. The movement of the wipers from one position to the next is controlled by a step coil or magnet 20m. Each cyclic energization and de-energization of the step coil 20m causes the wipers to move one position. The first 36 positions of the switch 20 are individually associated with the 36 amplifier circuits A1-A36 and the other four positions are utilized for control functions.

Section 20a of switch 20, as is hereinafter described, controls the changeover among the three types of tests of the circuits A1-A36. Section 20b of switch 20, as is also hereinafter described, functions in indicating the particular one of circuits A1-A36 being tested, and section 20c of switch 20 successively establishes connections to the circuits A1-A36.

With the stepping switch 20 at position 40, which is also its zero position, an operating path is provided for the zero position relay 23 and for the zero position indicator 25. The operating path for relay 23 is from the plus 28-volt potential source 26 through the wiper and terminal 40 of section 20b of switch 20 and the winding of relay 23 to ground. The zero position indicator 25 is shunted across the winding of relay 23 and accordingly is energized therewith. Since the operating path for the start control relay 21 is through the operated armature 1 of the zero position relay 23, the zero position relay 23 must be operated for the start switch 10 to initiate the testing cycle. If switch 20 is not at its zero position, it must be returned thereto before the testing sequence can be initiated.

When relay 21 operates, it in turn causes the operation of the drift check relays 28, 29 and 30, the tester operating relays 31 and 32 and the indicator 19. The operating path for relays 28, 29 and 30 is from a plus 28-volt potential source 34 through the operated armature 1 of relay 21, and the operating path for relays 31 and 32 is from a minus 28-volt potential source 35, through the operated armature 2 of relay 21 and the normal armature of the zero return switch 11. As is hereinafter described, relays 28-30 remain operated until the drift test is completed and relays 31 and 32 remain operated until all three tests are completed. The energizing path for the indicator 19 is from source 34 through the operated armature 1 of relay 21, the normal armature 2 of relay 97, the normal lower armature of switch 12 through the indicator 19 to ground. The indicator 19 is remotely located and is energized during the drift test, and, also as is hereinafter described, when the testing sequence is completed.

The start control relay 21 de-energizes when the start switch 10 is released because the start switch 10, and switches 11 and 14, as well, are momentary-type switches returning to normal when released. It is necessary, therefore, to provide locking or self-holding paths for the relays 28–32. When relays 28 and 31 operate, a locking path is completed from the plus 28-volt potential source 36 through the operated armature 1 of relay 31, the normal armature 1 of the negative test relay 37, the normal armature 1 of the positive output test relay 38 and the operated armature 2 of relay 28 to the windings of relays 28–30. Relay 31 completes another locking path from the minus 28-volt potential source 35 through its operated armature 2 and the normal armature of switch 11 to the windings of relays 31 and 32. In this manner, when the start switch 10 is released, relays 28–32 remain operated.

When relay 28 operates, it in turn operates the drift test relay 40, it energizes the drift test indicator or lamp 41 by completing an operating path from the plus 28-volt potential source 42 through its operated armature 1, and it removes the normal input or control signals to the analog computer which includes the circuits A1–A36. The analog computer is effectively disabled by the plus 28-volt control signal which is provided from source 42 through the operated armature 1 of relay 28 and lead C1. When relay 40 operates, it conditions all 36 amplifier circuits A1–A36 for the drift test. The operation of relay 40 completes a path from the source 42 through its operated armature 2 to the control terminal 44 of each of the circuits A1–A36. The connection of the plus 28-volt potential source 42 to terminal 44 of each of the circuits A1–A36 sets each of the circuits A1–A36 for testing the drift condition. An excessive drift condition at any one of the circuits A1–A36 would result in an excessive potential at its output terminal 45. In the illustrative embodiment described herein, a potential greater than plus 10 volts or less than minus ten volts at a terminal 45 indicates an excessive drift condition.

The control terminal 44 of circuit A1 is connected to the grounded winding of the drift relay 124. When relay 124 operates, it effectively changes the circuit A1 to a standard amplifier circuit particularly adapted for automatic testing. When relay 124 operates, it opens the normal feedback path of the standard amplifier 135 and completes therefor a standard feedback path, thereby providing a predetermined voltage gain for the amplifier. The normal feedback path for amplifier 135 is through the normal armature 1 of relay 124 and the feedback resistor 136. The standard feedback path is from the output terminal 45, through the junction of resistors 127 and 128, resistor 127 and the operated armature 2 of relay 124. Resistor 128 is grounded. The feedback circuit of amplifier 135 is altered in this manner so that a predetermined portion of any unbalance voltage existing at terminal 45 is fed back to the input of the amplifier 135. As described above, if the resulting potential at terminal 45 has a magnitude greater than 10 volts, the circuit A1 is rejected.

Each of the circuits A1–A36 is adjusted in a similar manner when relay 40 is operated. The circuits A1–A36 may all be different but each has an amplifier similar to 135. For example, circuit A36, which is shown for illustration as an integrating amplifier circuit, would have an integrating capacitor C136' instead of a feedback resistor connected across its amplifier 135. The drift relay 124 in circuit A36, however, functions in a manner similar to that described above for relay 124 in circuit A1, to disconnect the normal shunting or loading circuits and substitute therefore a standard feedback path.

When the drift check relay 29 in the test circuit operates, it readies a detector circuit 47 for recognizing an excess drift condition. The detector circuit 47 has three electrical conditions corresponding to the three tests of the circuits A1–A36. When relay 29 operates, it reduces the impedance connected to the control grids of the 6AU6 pentode tubes 48 and 49 by transferring, respectively, at its armatures 1 and 2 the connections from the 800-kilohm resistor 50 and the 1 megohm resistor 51 to the serially connected 250-kilohm rheostat 52 and 100-kilohm resistor 53 and to the serially connected 250-kilohm rheostat 54 and the 100-kilohm resistor 55. The resistors 50, 51, 53 and 55 are connected to the wiper of section 20c of switch 20, which, as hereinafter described, successively establishes connections to the terminals 45 of the amplifier circuits A1–A36. If relay 29 is normal instead of operated, so that resistors 50 and 51 are connected, respectively, to the control grids of the pentode tubes 48 and 49, the detector circuit 47 presents a loading condition to a connected one of circuits A1–A36 equivalent to its normal load.

The detector circuit 47 has two similar detector amplifiers; one including the pentode tube 48 and the other including the pentode tube 49. The amplifier including negative detector tube 48 is responsive to excess negative drift potentials and the amplifier including positive detector tube 49 is responsive to excess positive drift potentials. The associated circuitry of each of the pentode amplifiers is similar except that the control grid of tube 48 is biased through the 3-megohm resistor 58 by the plus 300-volt potential source 59, and the control grid of tube 49 is biased through the 3-megohm resistor 60 by the minus 300-volt potential source 61. The control grids of tubes 48 and 49 are shunted, respectively, through the .01 microfarad capacitors 74 and 75 to ground. The cathodes of tubes 48 and 49 are connected, respectively, through the 20-kilohm resistors 70 and 71 to their associated screen grids, and are directly connected to their associated suppressor grids. The screen grids of tubes 48 and 49 are, in turn, connected, respectively, through the 30-kilohm resistors 72 and 73 to the source 59. The fixed positive bias applied to the control grid of tube 48 establishes the conduction of tube 48 and energizes the winding of a negative detector relay 63. The operating path for relay 63 is from source 59 through the 18-kilohm plate resistor 64, the winding of relay 63, tube 48 and the 110-ohm cathode resistor 65 to ground. A similar path is provided for a positive detector relay 67 from source 59 through the 18-kilohm plate resistor 68, the winding of relay 67, tube 49 and the 110-ohm cathode resistor 66 to ground. Relay 67, however, is not operated because of the fixed negative bias on the control grid of tube 49. Thus, for a zero potential input to the detector circuit 47, relay 63 is operated and relay 67 is normal. As long as the condition of relays 63 and 67 does not change, the detector circuit 47 does not provide a drift failure indication.

The condition of relays 63 and 67 changes, respectively, when the input to the detector circuit 47 becomes less than minus 10 volts or greater than plus 10 volts, because an input potential between minus and plus 10 volts does not effect the conductive conditions of tubes 48 and 49. It is the operation of relay 29 which establishes the drift response conditions of the detector circuit 47. As described above, when relay 29 operates, it changes the impedance of the circuitry connecting the control grids of tubes 48 and 49 to section 20c of the stepping switch 20. The rheostats 52 and 54, which are connected, respectively, to the control grids of tubes 48 and 49 upon the operation of relay 29, are utilized to change the drift volt tolerances at the amplifier circuits A1–A36. For example, if the system containing the amplifier circuits A1–A36 is less critical to drift, the rheostats 52 and 54 can be adjusted to have tubes 48 and 49 insensitive to potentials having a magnitude somewhat greater than 10 volts.

As described above, at the same time that relay 29 is operated to condition the detector circuit 47 for the drift test, relays 30–32 are operated. When relay 32 is operated, it causes the operation of a free-running multivibrator circuit 80 which has an oscillating frequency of approximately 2.5 cycles per second. The multivibrator circuit 80 begins to oscillate when a biasing path from a minus 300-volt potential source 85 is shunted to ground through the operated armature 1 of relay 32.

The multivibrator circuit 80 consists essentially of a two-stage amplifier, with the outputs of each stage being coupled back to the input of the other state. Each stage includes one of the sections 81a and 81b of a 6BL double triode tube 81. The sections 81a and 81b are interconnected in a manner such that both sections cannot remain conducting at the same time. Before relay 32 is operated, the negative potential at the grid of section 81a from source 85 suppresses conduction through section 81a and the winding of a relay 88. Assuming the section 81a to be cut off, or nonconducting, due to the biasing path from its control grid through the 1 megohm resistor 83 and the 180-kilohm resistor 84 to the source 85, the anode of section 81a is at a potential of plus 300 volts due to its connection through the winding of relay 88 and the 18-kilohm plate resistor 89 to the plus 300-volt potential source 87.

With section 81a nonconducting, section 81b is conducting over a path from source 87 through the 27-kilohm resistor 90 and section 81b to ground. The anode of the conducting section 81b is at a substantially lower potential than the plus 300-volt potential at the anode of section 81a due to the potential across resistor 90. The sections 81a and 81b are interconnected by having the anodes of section 81a connected through the winding of relay 88 and .1 microfarad capacitor 91 to the control grid of section 81b, and the anode of section 81b connected through the .1 microfarad capacitor 92 to the control grid of section 81a. The control grid of section 81b is connected to ground through the 1 megohm grid resistor 94, and the control grid of section 81a is connected to ground through resistor 83 and the 100-kilohm resistor 95.

When relay 32 is operated, it connects, at its armature 1, the junction of resistors 83 and 84 to ground, shunting thereby the suppressive effect of the minus 300-volt potential source 85. The increase of potential at the control grid of section 81a initiates the conduction of section 81a. As section 81a becomes conductive, the potential at its anode decreases from the plus 300-volt potential of source 87. The decrease in potential at the anode of section 81a is provided as a negative pulse through the capacitor 91 to the control grid of section 81b. The small negative pulse applied to the control grid of section 81b is amplified by section 81b to appear as a sharp rise in potential at its anode. The increase in anode potential of section 81b is provided as a positive pulse through capacitor 92 to drive the grid of section 81a more positive. When the grid of section 81a becomes more positive, the conductivity of section 81a increases, and a further negative pulse is provided to the control grid of section 81b. The interaction continues in this manner with section 81a becoming saturated, or turned on, and section 81b cut off. During this interaction, the grid of section 81b is driven negative from a substantially zero bias by an amount equal to the change in anode potential of section 81a. As the pulses applied from the anodes subside, the biasing conditions on the two control grids begin to reverse. The potential at the anode of section 81b increases, and the potential at the anode of section 81a decreases. The change in biasing conditions is amplified by the sections 81a and 81b, which become, respectively, nonconductive and conductive. The two sections 81a and 81b oscillate in this manner as long as relay 32 is operated. When, as is hereinafter described, relay 32 is released, the suppressive effect of source 85 is restored to keep section 81a cut off. Each time section 81a becomes conductive, the winding of relay 88 is energized causing relay 88 to operate. This pulse-type of energization causes relay 88 to operate and release at the 2.5-cycle per second frequency of the multivibrator circuit 80.

The operation and release of the relay 88 in turn causes the operation and release of the step coil 20m of switch 20. The operating path for the coil 20m is from source 36 through the operated armature 1 of relay 31, the normal armature 1 of the test complete relay 97, the operated armature 1 of relay 88, the operated armature 1 of relay 63, the normal armature 1 of relay 67, the operated armature 1 of relay 30, the operated armature 2 of relay 32, the normal upper armature of the stop switch 12 and the winding of the step coil 20m to ground. Armature 1 of relay 88 is shunted by a contact-protecting circuit including the serially connected 100-ohm resistor 99 and the 1 microfarad capacitor 100. As long as relay 88 continues to cyclically operate and release, the step coil 20m cyclically energizes and releases therewith to step the switch 20.

When the wipers of sections 20a, 20b and 20c are stepped from position 40 to position 1 upon the first de-energization of coil 20m, the zero position relay 23 is released, the indicator 25 is de-energized, the indicator I1 is energized and the output terminal 45 of the amplifier circuit A1 is connected to the detector circuit 47. The indicator I1 is energized over a path from the source 26 through the wiper arm terminal 1 of section 20b and the indicator I1 to ground. The terminals 1–36 of section 20b are respectively connected to the indicators I1–I36 which are individually associated with the amplifier circuits A1–A36. The energization of the indicator I1 provides a visual indication that circuit A1 is being tested. The output terminal 45 of circuit A1 is connected to the detector circuit 47 through terminal 1 and the wiper arm of section 20c. The terminals 1–36 of section 20c are connected, respectively, to the output terminals 45 of circuits A1–A36 and the wiper arm of section 20c is connected, as described above, through the operated armatures 1 and 2 of relay 29 to the control grids of the amplifier detector tubes 48 and 49.

If the output terminal 45 of circuit A1 is at a potential between minus and plus 10 volts, the conductive conditions of tubes 48 and 49 and the operated conditions of relays 63 and 67 do not change: tube 48 remains conductive; tube 49 remains non-conductive; relay 63 remains operated; and relay 67 remains normal. With the detector circuit 47 unchanged, the step coil 20m continues to operate and then release under control of the multivibrator circuit 80 and to step switch 20 from position 1 to position 2.

If, however, the output potential of the selected circuit A1 is in excess of minus or plus 10 volts, the detector circuit 47 recognizes the unbalance or drift condition at circuit A1 and interrupts the stepping cycle. A positive potential greater than 10 volts at terminal 45 of circuit A1 causes conduction through tube 49 sufficient to energize the winding of the positive detector relay 67. Tube 48, which is conductive and relay 63, which is operated, remain, respectively, conductive and operated. When relay 67 operates, it provides an indication that the positive output is excessive and it interrupts the stepping cycle. The indication is provided, when relay 67 operates, by the grounded positive output indicator 102 which is connected through the operated armature 2 of relay 67 to source 42. The stepping cycle is interrupted because the operating path, described above, for coil 20m is through the normal armature 1 of relay 67. The multivibrator circuit 80 continues to oscillate as long as the tester operating relay 32 remains operated but the step switch remains at position 1.

The step switch 20 remains at position 1 until the drift condition at circuit A1 is corrected, or the circuit A1 is replaced or removed. The following indicators are energized during the time switch 20 remains at position 1: indicator 41 to indicate that the test is for drift; indicator 102 to indicate that the excessive potential condition is positive; and indicator I1 to indicate that the failure is at circuit A1. The negative test indicator 104, which is connected to source 42 through the normal armature 2 of relay 63, is normally de-energized because relay 63 is normally operated.

For an excessive negative drift voltage from circuit A1, positive detector tube 49 remains nonconducting and negative detector tube 48 becomes nonconducting de-energizing thereby the negative detector relay 63. When relay 63 releases, it provides a visual indication that the negative drift potential is excessive, and it interrupts the stepping cycle. The indication of excessive negative potential is provided by the energization of the indicator 104. The stepping cycle is interrupted because the operating path, described above, for coil 20m is through the operated armature 1 of relay 63. For an excessive negative drift potential, the condition of the testing circuit is, therefore, similar to that for the excessive positive drift potential except that indicator 104 and instead of the indicator 102 is energized.

If the first amplifier position is blank so that terminal 1 of section 20c is unterminated, the detector 47 passes the position as satisfactory. If the position is blank, a zero potential is applied to the detector circuit 47 which is calibrated, as described above, to respond to potentials having a magnitude greater than 10. It is for this reason that any of amplifier circuits A1–A36 may be disconnected and connected without requiring any circuit modifications of the testing circuit for the drift test.

If excessive drift potentials are not detected at any of the circuits A1–A36, the stepper switch 20 continues its advance through the 36 amplifier positions. When the stepper switch 20 reaches position 38 at the end of a successful drift test, it prepares an operating path for relays 38 and 105, and an energizing path for the positive output indicator 106. When relay 88 reoperates in preparation for stepping the switch 20 to position 39, the operating path for relays 38 and 105 and the energizing path for indicator 106 are completed. The operating and energizing paths are from source 36 through the operated armature 1 of relay 31, the operated armature 2 of relay 88, the wiper and terminal 38 of section 20a of switch 20, the normal armature 1 of relay 110 to the grounded windings of relays 38 and 105 and to the grounded indicator 106.

When relay 38 operates, it completes a locking path from source 36 through the operated armature 1 of relay 31, the normal armature 1 of relay 37 and the now operated armature 1 of relay 38. The operation of armature 1 of relay 38 also opens the locking path, described above, for the relays 28–30 which accordingly release and for the indicator 19 which accordingly de-energizes. When relay 38 releases, it also readies at its armature 2 another operating path for the step coil 20m. When relay 28 releases, it in turn releases the drift test relay 40 and the drift relays 124 in the circuits A1–A36, and it also de-energizes the drift test indicator 41. The operating path for relay 40, as described above, is through the operated armature 1 of relay 28. When relay 29 releases, it returns the detector circuit 47 to normal by re-establishing the respective connections through resistors 50 and 51 to the control grids of the tubes 48 and 49. When relay 30 releases, it opens at its armature 1 the original operating path for the step coil 20m.

When relay 105 operates, it conditions the amplifier circuits A1–A36 and the detector circuit 47 for the positive output test. More specifically, when relay 105 operates, it supplies a minus 28-volt potential to the terminal 108 of each of the circuits A1–A36 by connecting source 35 through its operated armature 1, the normal armature of the switch 15 and the normal armature 1 of relay 40. The terminals 108 of circuits A1–A36 are connected, respectively, through the windings of the 36 relays 129 and the resistors 130 to ground. When the relays 129 operate, the connections from terminals 108 are extended to the input of the amplifiers 135. The normal feedback and shunting paths are retained. The normal input to the circuits A1–A36 is not present because, as described above, when relay 28 operated, it removed the normal computer inputs. The actual disconnection of the amplifier circuits A1–A36 can readily be provided by having its normal output and input circuit connections pass through normally closed contacts, not shown, of relay 129. If the circuits A1–A36 are functioning satisfactorily, the potential at an output terminal 45 should be plus 100 volts after the connection of source 35 to the input terminals 108 and the connection of the respective output terminal 45 to the detector circuit 47. The circuits A1–A36 are designed to provide respectively, under normal loading conditions, a potential greater than plus 100 volts at terminals 45 when a minus 28-volt potential is applied to the control terminals 108.

The detector circuit 47 functions as a normal load for a connected one of the circuits A1–A36 after it has been conditioned by the operation of relay 105. When relay 105 operates, it adjusts the grid biasing circuits to change the impedance presented by the detector circuit 47 to the amplifier circuits A1–A36 to correspond with a normal amplifier circuit loading condition. The adjustment of the biasing circuits also conditions the detector circuit 47 for rejecting an amplifier circuit which provides a positive potential less than 80 volts. When relay 105 operates to adjust the grid biasing circuits, additional positive bias is provided at the control grids of tubes 48 and 49. The operation of relay 105 connects source 59 through the 680-kilohm resistor 109, its operated armature 2, resistor 50 and the normal armature 1 of relay 30 to the control grid of tube 48. The connection from the operated armature 2 of relay 105 is also extended through resistor 51 and the normal armature 2 of relay 30 to the control grid of tube 49.

Tube 48 remains conductive and the additional positive bias causes the conduction of tube 49 and the operation of relay 67. With switch 20 still at position 38 there is no input from the circuits A1–A36 to the detector circuit 47 and the positive test conditioned circuit 47 has both detector relays 63 and 67 operated.

When relay 67 operates, it energizes the indicator 102 and it completes an operating path for the coil 20m to initiate the stepping sequence for the positive output test. The operating path for coil 20m is from source 36 through the operated armature 1 of relay 31, the normal armature 1 of relay 97, the armature 1 of relay 88 when operated, the operated armatures 1 of relays 63 and 67, the operated armatures 2 of relays 38 and 32, the normal lower armature of switch 12 and the winding of coil 20m to ground. As relay 88 cyclically operates and releases, the switch 20 steps from position 38 through positions 39 and 40 to position 1.

When the wiper or arm of section 20a is moved to position 39, a path is readied for operating the negative changeover relay 110. The readied path for relay 110 is from source 36 through the operated armature 1 of relay 31, the armature 2 of relay 88, the wiper arm and terminal 39 of section 20a of switch 20 and the winding of relay 110 to ground. When relay 88 reoperates it completes the readied path for relay 110. When relay 110 operates, it also transfers, at its armature 1, a part of the operating path for relays 38 and 105 to the negative output test relays 37 and 111. Relays 38 and 105 are locked operated, as described above, and relays 37 and 111 do not operate until their now readied operated path is completed. The test circuit is readied, in this manner upon the operation of relay 110, for the automatic changeover from the positive to the negative output test at the termination of a successful positive output test. When relay 110 operates, it also locks to the source 36 through its operated armature 2 and the operated armature 1 of relay 31.

When switch 20 is stepped to position 40, relay 23 operates over a path through section 20b of switch 20 performing no function at this time. When the switch 20 steps to position 1, relay 23 releases.

When the switch 20 steps to position 1, indicator I1 is energized and terminal 45 of circuit A1 is connected through the terminal 1 and the wiper arm of section 20c of switch 20 to the grid or biasing circuits of tubes 48 and 49. The reflected impedance introduced by the connection of the circuit A1 to the detector circuit 47 indicates to the detector circuit 47 that position 1 is occupied by an amplifier circuit. The connection of an impedance at section 20c to the detector circuit 47 reduces the grid potential of both detector tubes 48 and 49 because the reflected impedance is shunted across resistors 50 and 51. The reduction of the grid potential of tube 48 is ineffective to interrupt the conduction of tube 48 because the control grid of tube 48 is only positively biased. The control grid of tube 49 is biased, however, by the positive potential source 59 and also by the negative potential source 61; the biasing path from source 59 is through resistors 109 and 51; and the biasing path from source 61 is through resistor 60. The conduction of tube 49 is insufficient to maintain the energization of relay 67 when the reflected impedance is introduced unless the positive output potential of circuit A1 is of a sufficient magnitude to maintain the conduction of tube 49. For the conduction of tube 49 to be sufficient for maintaining the operation of relay 67, the output potential of circuit A1 must at least be plus 80 volts. With a voltage equal to or greater than plus 80 volts, relay 67 remains operated and switch 20 is allowed to advance to the next position. If the amplifier position is blank, an additional load is not reflected to the detector circuit 47 and relay 67 remains operated because of the positive bias applied through the operated armature 2 of relay 105.

If an amplifier position is occupied and less than plus 80 volts is applied to the detector circuit 47, relay 67 releases. When relay 67 releases, it opens the operating path, described above, for coil 20m. With switch 20 halted, the energized indicator 106 provides an indication that the failure is in the positive output test and the energized one of indicators I1–I36 provides an indication of the identity of one of circuits A1–A36 being tested. The test circuit remains at this position until the fault is corrected or the amplifier circuit is removed or replaced.

As described above, each of the amplifier circuits A1–A36 is designed to provide a potential of at least plus 100 volts at its terminal 45 when it is under normal loading conditions and a minus 28-volt control or conditioning potential is applied to its terminal 108. When one of the circuits A1–A36 is connected to the detector circuit 47, the detector circuit 47 functions as a normal load therefor. Three functions, all described above, are simultaneously performed, therefore, upon the connection of any one of the circuits A1–A36 to the detector circuit 47:

(1) The detector circuit 47 functions as a normal load for the connected one of the circuits A1–A36;

(2) The reflected impedance introduced by the connection indicates at the detector circuit 47 that the amplifier position is occupied; and (3) The detector circuit 47 can test the amplifier circuit output potential under normal load.

When the wiper arm of section 20a of switch 20 reaches terminal 38 at the termination of a positive output test and relay 88 reoperates, the readied operating path for the negative output test relays 37 and 111 is completed. The operating path for relays 37 and 111 is from source 36 through the operated armature 1 of relay 31, the operated armature 2 of relay 88, the wiper arm and terminal 38 of section 20a of switch 20, the operated armature 1 of relay 110 and the windings of relays 37 and 111, and also the negative output test indicator 113, to ground. When relay 37 operates, it transfers the locking path from source 36 at its armature 1, so that relays 38 and 105 release and the indicator 106 de-energizes, and relays 37 and 111 remain locked operated and indicator 113 locked energized.

When relay 105 releases, it opens the positive biasing path from its armature 2 for tubes 48 and 49, and it changes the conditioning potential at terminal 108 of circuits A1–A36 for the negative output test. The operation of relay 105 opens at its armature 1 the path to circuits A1–A36 from source 35, releasing and connects source 36 thereto instead. Relays 29 in circuits A1–A36 remain operated during the transfer operation at the armature 1 of relay 105. Source 36 is connected through the operated armature 1 of relay 31, the operated armature 1 of relay 37, the normal armature 1 of relay 105, the normal armature of switch 15 and the normal armature 1 of switch 40 to the terminals 108 of circuits A1–A36.

When relay 111 operates, it conditions the detector circuit 47 in accordance with the negative output test by providing a negative bias to the control grids of tubes 48 and 49. When relay 111 operates, it connects source 61 through the 1.8-megohm resistor 114, the operated armature 1 of relay 111, resistor 50 and the normal armature 1 of relay 29 to the control grid of tube 48. The operated armature 1 of relay 111 also connects source 61 through resistor 51 and the normal armature 2 of relay 29 to the control grid of tube 49.

The switch 20 steps from position 38 through positions 39 and 40 to position 1. The connection of any one of the circuits A1–A36 to the detector circuit 47 provides a normal loading condition for the connected one of the circuits A1–A36 and provides a reflected impedance at the detector circuit 47 which indicates the occupancy of the amplifier position. The operation of the detector circuit 47 during the negative output test is similar to that for the positive output test except that it is the negative output potential instead of the positive output potential which is checked. For the positive output test, tube 49, which was both positively and negatively biased, was responsive to the detector input conditions. For the negative output test, tube 48, which is both positively and negatively biased, is responsive to the detector input condition. If an amplifier position is occupied, tube 48 remains sufficiently conductive to energize the winding of the negative detector relay 63 only if the negative output potential of the selected amplifier circuit is of a magnitude greater than 80 volts. With a magnitude less than 80 volts, the reflected impedance of the selected amplifier circuit is sufficient to reduce the conduction of tube 49 and release relay 63.

If relay 63 releases, it energizes the indicator 104 and it opens, at its armature 1, the operating path for coil 20m. The stepping sequence remains interrupted until the amplifier circuit is changed or removed or the fault corrected. The indicator 113 remains energized to identify the test, and one of the lamps I1–I36 remains energized to identify the amplifier circuit.

When the switch 20 reaches position 37 at the end of the negative output test and relay 88 thereafter operates, the test complete relay 97 is operated, and the test complete indicator 117 is energized. The operating path for relay 97 and indicator 117 is from source 36 through the operated armature 1 of relay 31, the operated armature 2 of relay 88, the wiper arm and terminal 37 of section 20a of switch 20, the operated armature 2 of relay 111 to the grounded winding of relay 97 and the grounded indicator 117.

When relay 97 operates, it opens at its armature 1 the operating path for coil 20m to halt the stepping operation of switch 20, and it locks to source 36. The testing circuit remains in this condition with switch 20 at position 37 and the indicator 117 energized. The energization of the indicator 117 indicates that the entire testing sequence has been successfully completed. When relay 97 operates, it also reenergizes the remote indicator 19 over a path from source 36 through the operated armature 1 of relay 31, the operated armatures 2 of relays 110 and 97 and the normal upper armature of switch 12 to the grounded indicator 19.

Zero return switch 11

At the end of the testing sequence, or at any time during the testing sequence, the testing circuit may be normalized with the switch 20 returned to position 40. When the momentary-type switch 11 is deflected, the operating path for relays 31 and 32 is opened causing them to release. When relay 31 releases, it in turn releases relays 110, 97, 37 and 111 in the test circuit and relays 29 in circuits A1–A36, and it also de-energizes the indicators associated with the relays 110, 97, 37 and 111. When relay 111 releases, it returns the detector circuit 47 to normal.

When relay 32 releases, it opens, at its armature 1, the shunting path to interrupt or halt the operation of the multivibrator circuit 80, and it initiates a stepping operation for switch 20. The stepping operation is initiated upon the release of the armature 2 of relay 32 which closes a path from source 36 through the normal armature 2 of relay 23, the step interrupter contacts of the step coil 20m, the normal armature 2 of relay 32 and the normal lower armature of switch 12 to the winding of coil 20m. The step interrupter contacts are shunted by serially connected 100-ohm resistor 119 and the 1 microfarad capacitor 120 which function as a contact protection circuit.

When the step coil 20m energizes, it opens its operating path at its interrupter contacts to step the switch 20. When coil 20m de-energizes, its contacts reclose and reenergize the coil 20m. The energizing and de-energizing cycle continues until switch 20 is stepped to position 40, or its zero position. When the switch 20 is stepped to position 40, relay 23 is operated and the indicator 25 is energized by a path through section 20b. When relay 23 operates, it opens the stepping path through its armature 2, and it readies the testing circuit for another testing sequence. The testing circuit is readied, as described above, when armature 1 of relay 23 is operated.

Stop switch 12

At any point during the testing cycle, the stepping of switch 20 may be halted by actuating the stop switch 12. The normal operating path for coil 20m is, as described above, through the normal lower armature of switch 12. When switch 12 deflected, coil 20m is de-energized, or remains de-energized. When the stop switch is returned to normal, the indicator 122 is de-energized and the stepping cycle continues from the point of interruption. When the switch 12 is actuated, it also provides an energizing path for the indicator 19 if switch 12 is actuated during the drift test. When switch 12 is actuated, it interrupts the original energizing path for indicator 19 and closes through its upper armature a direct connection to source 36. Indicator 19 remains energized as long as the testing circuit is in a drift test condition.

Advance switch 14

When the stop switch 12 is actuated, or at any time the normal operating path for coil 20m is incomplete, the switch 20 may be positioned by actuating the momentary-type advance switch 14. The switch 14 provides a by-pass path from source 36 to the step coil 20m. Switch 14 is reflected as many times as necessary to advance the switch 20 to a desired position.

Drift test switch 13

A manual drift test can be performed by actuating the drift test switch 13. When switch 13 is deflected, it connects the source 42 to the winding of relay 40 and to indicator 41. When relay 40 operates, as described above, it conditions the circuits A1–A36 for a drift test by connecting source 42 to the control terminals 44 of circuits A1–A36. The advance switch 14 is then utilized to advance the switch 20 to position 1. When the switch 20 steps to position 1, the zero position relay 23 releases and closes the step interrupter circuit for coil 20m. The switch 20 is driven through the stepping sequence by the operation of the step interrupter circuit. The detector circuit 47, however, is not conditioned for the drift test but a stepper switch output jack 125 is provided. The jack 125 is connected to the wiper arm of section 20c to make the outputs of amplifier circuits A1–A36 available. During the manual drift test, the stop switch 12 can be actuated to halt the stepping sequence and thereafter the advance switch 14 can be deflected to advance the switch 20 to any amplifier position.

Output test switches 15 and 16

The output test switches 15 and 16 are utilized to prepare the testing circuit for a manual positive or negative output test. When switch 15 is deflected, it connects the source 42 through the normal switch 16, the actuated switch 15 and the normal armature 1 of switch 40 to the input terminals 108 of circuits A1–A36. The stepper switch 20 is thereafter manually advanced by switch 14 to any amplifier position, and jack 125 is utilized to check the amplifier circuit output. The step interrupter circuit can also be used to automatically step the switch 20 through the 36 amplifier positions.

When switch 16 is deflected, after switch 15 has been deflected, the negative potential source 35 is connected to the circuits A1–A36. The source 35 is connected through the operated switches 16 and 15 and the normal armature 1 of switch 40 to terminals 108. The switch 12 and the step interrupter circuit can be utilized, in a similar manner as described above, to step switch 20.

Selector switches 17 and 18

During system adjustment procedures, the manual output switches 17 and 18 may be utilized for obtaining individual amplifier circuit output irrespective of the operation of the rest of the testing circuit. The second, third, fourth and fifth terminals of switch 17 may be utilized to select, respectively, the groups of circuits A1–A10, A11–A20, A21–A30 and A31–A36. The switch 18 may be utilized to select the circuit in the group.

Switch 18 has four sections 18(a–d) each having a number of terminals. The terminals 1–10 of section 18a are connected, respectively, to circuits A1–A10, the terminals 1–10 of section 18b are connected, respectively, to circuits A11–A20, terminals 1–10 of section 18c are connected, respectively, to circuits A21–A30 and terminals 1–6 of section 18d are connected, respectively, to circuits A31–A36. The switches 17 and 18 can connect the output terminal 45 of any one of the circuits A1–A36 to jack 126 independent of the condition of the rest of the stepping circuit. For example, if the circuit 22 is to be selected, switch 17 is set at terminal 4 to select the group 21–30 and switch 18 is set at terminal 2 to select the second circuit in the group. With the selector switches 17 and 18 set, respectively, at terminals 4 and 2, a connection is provided from the manual selector output jack 126 through terminals 5 and 4 of switch 17, the input terminal and terminal 2 of section 18c of switch 18 to the output terminal 45 of circuit A22.

The invention is not restricted to the specific embodiment disclosed herein as numerous other arrangements may be devised by those skilled in the art without departing from the spirit and scope of the invention. For example, a larger stepping switch or a number of sequentially operated stepping switches may be provided so that a larger number of circuits may be tested. The circuits A1–A36 represent any circuit arrangement which provides a predetermined potential output responsive to a control potential and the detector circuit 47 can, of course, be adjusted for detecting different potential conditions. The test circuit can also be modified to make the positive and negative output tests successively on one of the amplifier circuits A1–A36 before stepping to the next one of the circuits A1–A36 or all three tests before stepping to the next one of the circuits A1–A36. These modifications are merely illustrative and it is evident that various other modifications may be devised without departing from the spirit and scope of the invention.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In combination, an analog computer having a plurality of different circuit arrangements, each of said arrangements having a standard amplifier, a plurality of circuit components normally connected to said amplifier, and means for disconnecting said components from said amplifier; a testing circuit for performing a number of different tests on each of said arrangements; an adjustable detector circuit in said testing circuit; means in said testing circuit for automatically and cyclically associating said plurality of said arrangements with said detector circuit; means in said testing circuit controlled by said automatic associating means for operating said disconnect means in each of said plurality of arrangements and for supplying a standard input signal to said plurality of arrangements; and means in said test circuit and controlled by said automatic associating means for adjusting said detector circuit in accordance with the particular one of said tests to be performed.

2. An automatic testing circuit for subjecting a plurality of different amplifier circuits of an analog computer to a plurality of tests, comprising an adjustable detector circuit having circuit means effective upon the connection of any one of said amplifier circuits thereto for presenting a normal load to said connected amplifier circuit; a stepping switch connected to said detector circuit and having a plurality of terminals; means individually connecting some of said terminals with said amplifier circuits; means for cyclically operating said switch to connect said terminals with said detector circuit independent of the connections between said terminals and said amplifier circuits; means controlled by said detector circuit upon the detection of a fault for halting the operation of said switch; means effective upon the initiation of operation of said switch for effectively disconnecting said amplifier circuits from the rest of the analog computer; and means effective upon each cyclic operation of said switch for adjusting said detector circuit in accordance with one of the tests to be performed.

3. In combination, a plurality of different amplifier circuit arrangements, each of said arrangements having a standard amplifier, a plurality of circuit components normally connected to said standard amplifier, and means for disconnecting said components from said standard amplifier; means for ascertaining the output voltage of a standard amplifier; means associated with said testing means for operating said disconnect means; means effective after the operation of said disconnect operating means for successively associating said standard amplifiers with said testing means; and means in said testing means for halting the operation of said successive associating means when said output voltage differs in a prescribed manner from a predetermined set of performance criteria.

4. A testing circuit for use in an analog computer having a plurality of diverse operational amplifier circuits, comprising in combination, a voltage detecting circuit, selector switching means operable to connect the output terminals of said amplifiers successively to said detecting circuit, and a plurality of further switching means, each associated with one of said operational amplifiers, for disconnecting said amplifiers from the other portions of said amplifier circuits and reconnecting said amplifiers to provide the same overall voltage gain in each of the properly operating ones of said amplifiers.

5. A circuit as claimed in claim 4 in which said analog computer contains a plurality of feedback amplifiers having diverse feedback impedances, and in which a plurality of said further switching means are provided to disconnect such feedback impedances from said amplifiers and to substitute impedances having a different value from that of at least one of said diverse feedback impedances, so that each of said amplifiers is reconnected to provide, if operating properly, the same voltage gain.

6. A circuit as claimed in claim 4 in which said analog computer contains one or more electronic integrator circuits, said integrator circuits comprising one or more operational amplifiers having feedback capacitors, and in which one or more of said further switching means are provided to disconnect said feedback capacitors from said integrator circuits and to substitute feedback resistors.

7. Apparatus as claimed in claim 4 capable of successively performing a plurality of different tests on said amplifiers, said apparatus having condition switching means synchronized with said selector switching means, said condition switching means being operable successively to modify operation of said voltage magnitude detecting circuit in accordance with the nature of the test being performed.

8. Apparatus according to claim 4 having means responsive to said detecting circuit for halting said selector switching means upon detection of a predetermined output voltage condition at any of said amplifiers.

9. Apparatus according to claim 4 in which said detecting circuit is connected to respond only to voltages outside two predetermined limits of magnitude to halt said selector switching means.

10. Apparatus according to claim 4 in which said detecting circuit has means responsive to the impedance of the circuit connected to said detecting circuit by said selector switching means, said detector circuit being operable upon connection to a blank circuit to alter operation of said detecting circuit.

References Cited in the file of this patent

UNITED STATES PATENTS

| 2,244,751 | Werrmann | June 10, 1941 |
| 2,584,680 | Doncyson | Feb. 5, 1952 |
| 2,742,611 | Antos | Apr. 17, 1956 |
| 2,756,409 | Lubkin | July 24, 1956 |
| 2,762,014 | Anderson | Sept. 4, 1956 |
| 2,796,567 | Boode | June 18, 1957 |

FOREIGN PATENTS

| 1,114,472 | France | Apr. 12, 1956 |